(12) United States Patent
Ma et al.

(10) Patent No.: US 10,678,532 B2
(45) Date of Patent: Jun. 9, 2020

(54) METHOD AND APPARATUS FOR UPGRADING APPLICATION

(71) Applicant: Alibaba Group Holding Limited, George Town (KY)

(72) Inventors: Wenqi Ma, Hangzhou (CN); Lei Cheng, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/395,990

(22) Filed: Apr. 26, 2019

(65) Prior Publication Data
US 2019/0250904 A1    Aug. 15, 2019

Related U.S. Application Data

(63) Continuation of application No. PCT/CN2017/106672, filed on Oct. 18, 2017.

(30) Foreign Application Priority Data

Oct. 28, 2016 (CN) .......................... 2016 1 0974024

(51) Int. Cl.
*G06F 9/44* (2018.01)
*G06F 8/65* (2018.01)
(Continued)

(52) U.S. Cl.
CPC ............... *G06F 8/65* (2013.01); *G06F 8/656* (2018.02); *G06F 9/45504* (2013.01); *G06F 9/485* (2013.01)

(58) Field of Classification Search
CPC ..................................................... G06F 8/65
See application file for complete search history.

(56) References Cited

U.S. PATENT DOCUMENTS 7,886,287 B1 * 2/2011 Davda .................. G06F 9/322
                                                                717/168
2004/0107416 A1 * 6/2004 Buban .................. G06F 8/658
                                                                717/170
(Continued)

FOREIGN PATENT DOCUMENTS

CN          105117265         12/2015
CN          105335183         2/2016
(Continued)

OTHER PUBLICATIONS (Internet article: Alibaba joins the Apache Foundation and donates project JStorm, dated Nov. 19, 2015, retreived on Jul. 10, 2019).*
(Continued)

*Primary Examiner* — Hang Pan
(74) *Attorney, Agent, or Firm* — Fish & Richardson P.C.

(57) ABSTRACT

A name of a submitted application is obtained. A determination is made that the name of the submitted application is same as a name of an existing application. In response to determining that the name of the submitted application is same as the name of the existing application: a predetermined disable command is triggered, where the predetermined disable command invokes an end function for each node in the existing application; for each particular node in the existing application, a particular process occupied by the particular node in the existing application is recycled when receiving execution completion information from the existing application; and a predetermined start command is triggered when the recycling is completed, where the predetermined start command starts a process for each node in the submitted application.

15 Claims, 10 Drawing Sheets

(51) Int. Cl.
  *G06F 9/48* (2006.01)
  *G06F 9/455* (2018.01)
  *G06F 8/656* (2018.01)

(56) References Cited

U.S. PATENT DOCUMENTS

| | | | |
|---|---|---|---|
| 2012/0030223 A1* | 2/2012 | Stein | G06F 9/4843 |
| | | | 707/756 |
| 2012/0096365 A1* | 4/2012 | Wilkinson | G06F 9/468 |
| | | | 715/740 |
| 2014/0157251 A1 | 6/2014 | Hocker et al. | |

FOREIGN PATENT DOCUMENTS

| | | |
|---|---|---|
| CN | 105528231 | 4/2016 |
| CN | 105677433 | 6/2016 |
| CN | 105824618 | 8/2016 |
| CN | 106980515 | 7/2017 |
| WO | WO 2007075846 | 7/2007 |

OTHER PUBLICATIONS

International Preliminary Report on Patentability in International Application No. PCT/CN2017/106672, dated Apr. 30, 2019, 10 pages (with English translation).

International Search Report and Written Opinion in International Application No. PCT/CN2017/106672, dated Jan. 23, 2018, 17 pages (with English translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

METHOD AND APPARATUS FOR UPGRADING APPLICATION

CROSS-REFERENCE TO RELATED APPLICATIONS

This application is a continuation of PCT Application No. PCT/CN2017/106672, filed on Oct. 18, 2017, which claims priority to Chinese Patent Application No. 201610974024.6, filed on Oct. 28, 2016, and each application is hereby incorporated by reference in its entirety.

TECHNICAL FIELD

The present application relates to the field of computer technologies, and in particular, to a method and an apparatus for upgrading an application.

BACKGROUND

Various services provided by a system for users are actually supported by various corresponding applications.

Usually, a running application receives backflow data from other data sources (such as systems, applications, clients, etc.) all the time. A recommendation scenario is used as an example. User A reads an article, and then the behavior data (namely, reading the article) flows back to a system by using a log. After parsing the log, the system queries friend information of user A, and then flows back the behavior data and the friend information of user A to a recommendation application. As such, the recommendation application can recommend information similar to "Your friend A has read the XX article" to friends of user A based on the backflow data. This kind of application requires high availability because the application needs to provide services for users in real time. However, an application inevitably needs to be upgraded.

In the existing technology, an application upgrade procedure is shown in FIG. 1. In the upgrade process, an operation needs to be performed after manual confirmation in each phase. The procedure includes the following steps:

A1. Manually stop an old application from receiving backflow data from a data source.

A2. Manually submit a command (namely, a kill command) for disabling the old application to an application management module after manually confirming that processing of unprocessed data in the old application is completed.

A3. Manually submit a command (namely, a start command) for starting a new application to the application management module after manually determining that the application management module completely disables the old application.

A4. Wait for the application management module to start the new application.

As described above, because the application is down for upgrade, a service cannot be provided for a user in the entire upgrade process until the new application is started. In addition, because human participation is needed in each phase, a relatively long time is needed for upgrading the entire application. As shown in FIG. 1, a time consumed between A1 and A2 is greater than 4 minutes, a time consumed between A2 and A3 is greater than 3 minutes, a time consumed between A3 and A4 is greater than 3 minutes, and the entire upgrade process needs to take more than 10 minutes.

In conclusion, in the existing technology, there is a problem that an application upgrade takes a relatively long time.

SUMMARY

The present application provides a method and an apparatus for upgrading an application, to alleviate a problem in the existing technology that an application upgrade takes a relatively long time.

According to a method for upgrading an application provided in an implementation of the present application, the method is applied to an application management module, and the method includes the following: obtaining an application name of a submitted application; triggering a predetermined disable command when the submitted application has the same name as an existing application, to invoke an end function of each node in the existing application; recycling a process occupied by each node when receiving execution completion information returned by the existing application; and triggering a predetermined start command when recycling is completed, to start a process that corresponds to each node in the submitted application.

Optionally, the triggering a predetermined disable command when the submitted application has the same name as an existing application, to invoke an end function of each node in the existing application includes the following: determining whether a submitted upgrade command for the existing application is received when the submitted application has the same name as the existing application; and triggering the predetermined disable command when the submitted upgrade command for the existing application is received, to invoke the end function of each node in the existing application.

Optionally, the application includes a JStorm application.

The process includes a jvm process.

According to a method for disabling an application provided in an implementation of the present application, the method is applied to an application to be upgraded, and the method includes the following: after an application management module invokes an end function of a node, stopping a root node from receiving backflow data, and determining the root node as a current node; processing data in the current node and sending the data to a downstream node; broadcasting an ending identifier to all downstream subnodes of the current node after completing processing of the data in the current node and receiving ending identifiers broadcast by all upstream nodes; and when the current node has a next node, determining the next node as the current node, and returning to perform the step of processing data in the current node and sending the data to a downstream node; or when the current node is the last node, returning, by the root node, execution completion information to the application management module to wait for the application management module to recycle a process that corresponds to each node.

Optionally, the application includes a JStorm application.

The process includes a jvm process.

According to an apparatus for upgrading an application provided in an implementation of the present application, the apparatus is applied to an application management module, and the apparatus includes the following: an acquisition unit, configured to obtain an application name of a submitted application; an invocation unit, configured to trigger a predetermined disable command when the submitted application has the same name as an existing application, to invoke an end function of each node in the existing application; a recycling unit, configured to recycle a process occupied by each node when execution completion information returned by the existing application is received; and an initiation unit, configured to trigger a predetermined start command when recycling is completed, to start a process that corresponds to each node in the submitted application.

Optionally, the invocation unit includes the following: a determining subunit, configured to determine whether a submitted upgrade command for the existing application is received when the submitted application has the same name as the existing application; and an invocation subunit, configured to trigger the predetermined disable command when the submitted upgrade command for the existing application is received, to invoke the end function of each node in the existing application.

Optionally, the application includes a JStorm application.

The process includes a jvm process.

According to an apparatus for disabling an application provided in an implementation of the present application, the apparatus is applied to an application to be upgraded, and the apparatus includes the following: a receiving stopping unit, configured to: after an application management module invokes an end function of a node, stop a root node from receiving backflow data, and determine the root node as a current node; a data processing unit, configured to process data in the current node and send the data to a downstream node; an identifier broadcasting unit, configured to broadcast an ending identifier to all downstream sub-nodes of the current node after processing of the data in the current node is completed and ending identifiers broadcast by all upstream nodes are received; a control unit, configured to: when the current node has a next node, determine the next node as the current node, and then input data of the next node to the data processing unit; and an information returning unit, configured to: when the current node is the last node, return, by the root node, execution completion information to the application management module to wait for the application management module to recycle a process that corresponds to each node.

Optionally, the application includes a JStorm application.

The process includes a jvm process.

In the implementations of the present application, the application management module (such as a topology manager (TM)) is reconstructed, so that the application management module can allow a user to submit the application that has the same name as the existing application. Therefore, the application management module can automatically upgrade the existing application that has the same name when detecting that the user submits the application that has the same name. As such, the problem in the existing technology that a relatively long time is consumed because human participation is needed in an application upgrade process can be avoided, thereby reducing a time consumed for an application upgrade. In the implementations of the present application, an application ending procedure is further reconstructed, so that any node needs to broadcast an ending identifier to all downstream nodes when completing processing of data in the node and receiving ending identifiers broadcast by all upstream nodes. The root node can return the execution completion information to the application management module after all the nodes complete data processing, to wait for the application management module to recycle the process that corresponds to each node. Therefore, it can be ensured, by using the ending identifier, that processing of data in each node of the application is completed, to ensure the integrity of data processing and avoid omission that occurs when completion of data processing is determined manually. In addition, because there is no human participation, the time consumed for the application upgrade can be reduced.

DESCRIPTION OF IMPLEMENTATIONS

Example implementations are described in detail here, and examples of the implementations are presented in the accompanying drawings. When the following description relates to the accompanying drawings, the same numbers in different accompanying drawings represent the same or similar elements unless specified otherwise. Implementations described in the following example implementations do not represent all implementations consistent with the present application. Instead, they are only examples of apparatuses and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context. It should be further understood that the term "and/or" used in the present specification indicates and includes any or all possible combinations of one or more associated listed items.

It should be understood that although terms "first", "second", "third", etc. can be used in the present application to describe various types of information, the information is not limited to the terms. These terms are only used to differentiate between information of a same type. For example, without departing from the scope of the present application, first information can also be referred to as second information, and similarly, the second information can be referred to as the first information. Depending on the context, for example, the word "if" used here can be explained as "while", "when", or "in response to determining".

The following illustrates a JStorm scenario that the implementations of the present application can be applied to.

Storm is an open-source distributed fault-tolerant real-time computing system, and the complexity of parallel batch data processing can be reduced by using Storm. Generally, Storm is used in a system for real-time processing.

JStorm is a quasi-Storm system re-implemented by using JAVA. JStorm inherits all advantages of Storm, and JStorm is more powerful, more stable, and has better performance than Storm.

Usually, a JStorm application can be deployed in an application management module (such as a topology manager (TM)) of a system. The JStorm application can communicate with the application management module, and complete functions such as an application upgrade.

Figure 1:
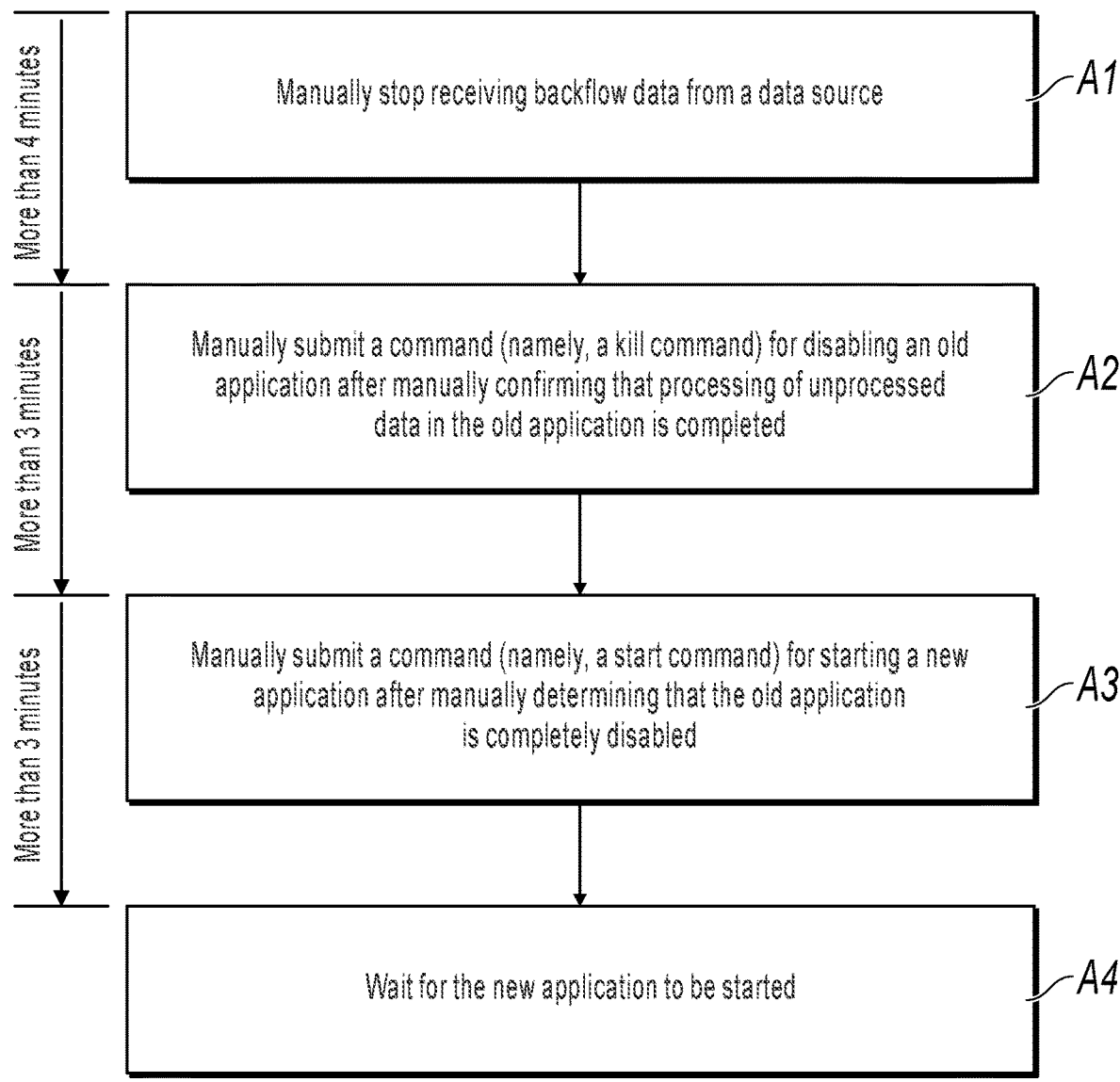
FIG. 1 is a flowchart illustrating a method for upgrading an application in the existing technology.
Figure 2:
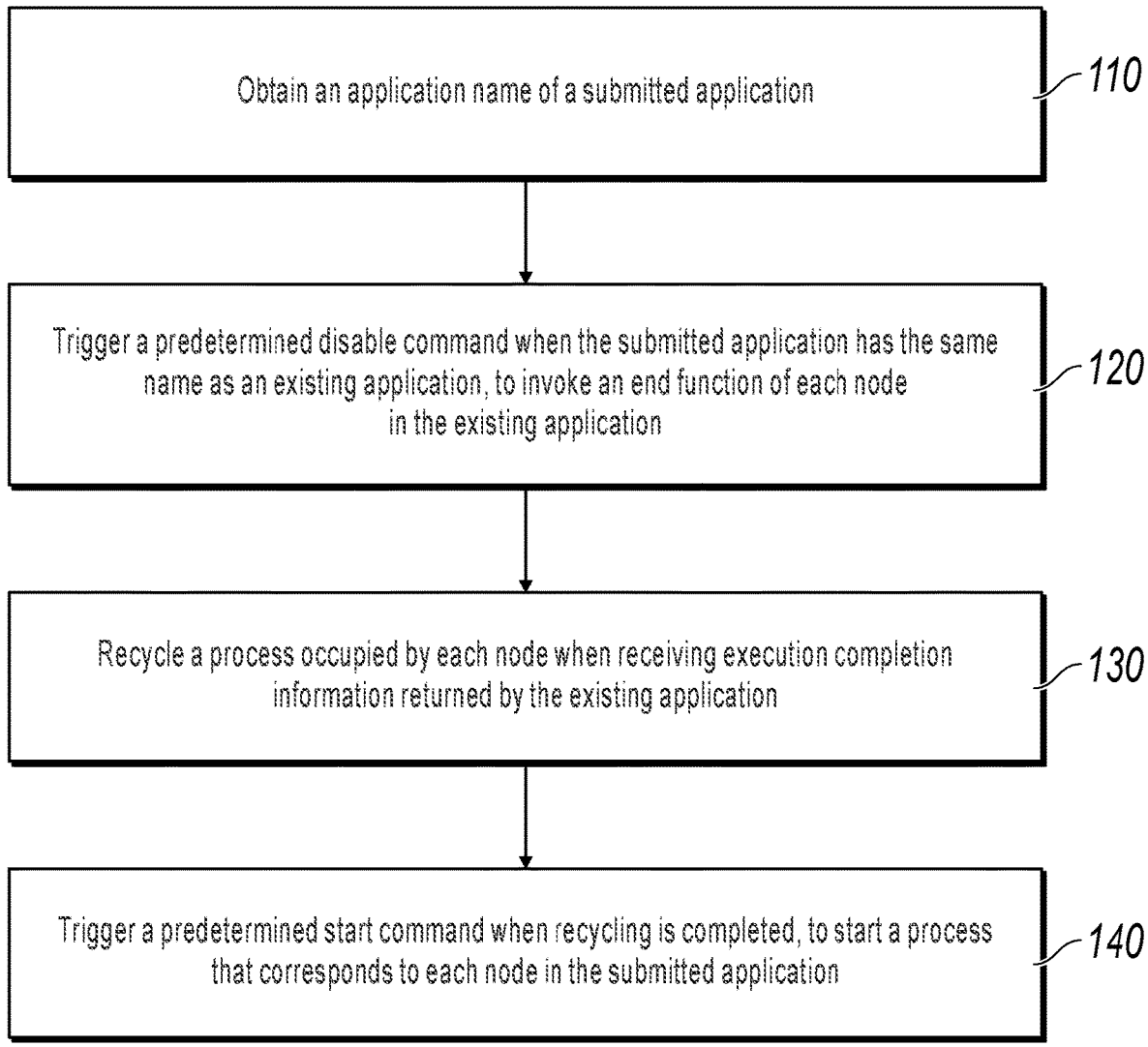
FIG. 2 is a flowchart illustrating a method for upgrading an application, according to an implementation of the present application.

FIG. 2 is a flowchart illustrating a method for upgrading an application, according to an implementation of the present application. The present implementation is described from the perspective of an application management module side, and includes the following steps:

Step 110: Obtain an application name of a submitted application.

In the present implementation, an application management module is reconstructed to allow a user to submit an application that has the same name as an existing application in the application management module.

After the user submits the application, the application management module can obtain the application name of the submitted application.

Step 120: Trigger a predetermined disable command when the submitted application has the same name as an existing application, to invoke an end function of each node in the existing application.

In the present implementation, if the application provided by the user has the same name as the existing application, it indicates that the existing application that has the same name needs to be upgraded, and the application manager automatically enters an upgrade procedure, that is, triggers the predetermined disable command to invoke the end function of each node in the existing application.

The end function is used by the node to process unprocessed data and wait to recycle a process that corresponds to the node.

Step 130: Recycle a process occupied by each node when receiving execution completion information returned by the existing application.

In the present implementation, after invoking the end function of each node in the existing application, the application management module needs to wait for each node in the existing application to process unprocessed data.

Usually, after completing processing of data, the existing application returns one piece of execution completion information. Therefore, when the application management module receives the execution completion information returned by the existing application, it indicates that all unprocessed data in the existing application has been processed. Therefore, the process occupied by each node can be recycled.

Step 140: Trigger a predetermined start command when recycling is completed, to start a process that corresponds to each node in the submitted application.

In the present implementation, after the application management module recycles processes occupied by all nodes in the existing application, it indicates that the existing application is completely disabled, and then the submitted application can be started.

The predetermined start command is triggered when recycling is completed, to start the process that corresponds to each node in the submitted application.

After the process that corresponds to each node in the submitted application is started, it indicates that the submitted application is started. As such, an entire application upgrade process ends.

According to the present implementation, the application management module is reconstructed, so that the application management module can allow the user to submit the application that has the same name. Therefore, the application management module can automatically upgrade the existing application that has the same name when detecting that the user submits the application that has the same name. As such, a time consumed for an application upgrade can be reduced (which can be shortened to about 3 minutes), and a problem in the existing technology that a relatively long time is consumed because human participation is needed in an application upgrade process can be avoided.

In the previous implementation, the application management module automatically upgrades the existing application that has the same name as long as the application management module detects that the submitted application has the same name, that is, disables an old application (the existing application), and starts a new application (the submitted application). As such, although an application upgrade time can be shortened, application submission is operated manually in actual applications. The manual operation usually has many uncertainties. For example, although the application submitted by the user has the same name, the application is not used to upgrade the old application, but is only another application that has the same name. In this case, the old application is directly upgraded by using the method for upgrading an application provided in the previous implementation. Consequently, an upgrade error occurs.

To alleviate such a problem, in another implementation of the present application, step 120 can include the following steps: determining whether a submitted upgrade command for the existing application is received when the submitted application has the same name as the existing application; and triggering the predetermined disable command when the submitted upgrade command for the existing application is received, to invoke the end function of each node in the existing application.

Compared with the previous implementation, in the present implementation, the application management module does not directly upgrade the existing application when detecting that the submitted application has the same name, and it needs the user's confirmation. After determining, the user can return an upgrade command. The application management module triggers the predetermined disable command when the submitted upgrade command for the existing application is received, to invoke the end function of each node in the existing application.

Figure 3:
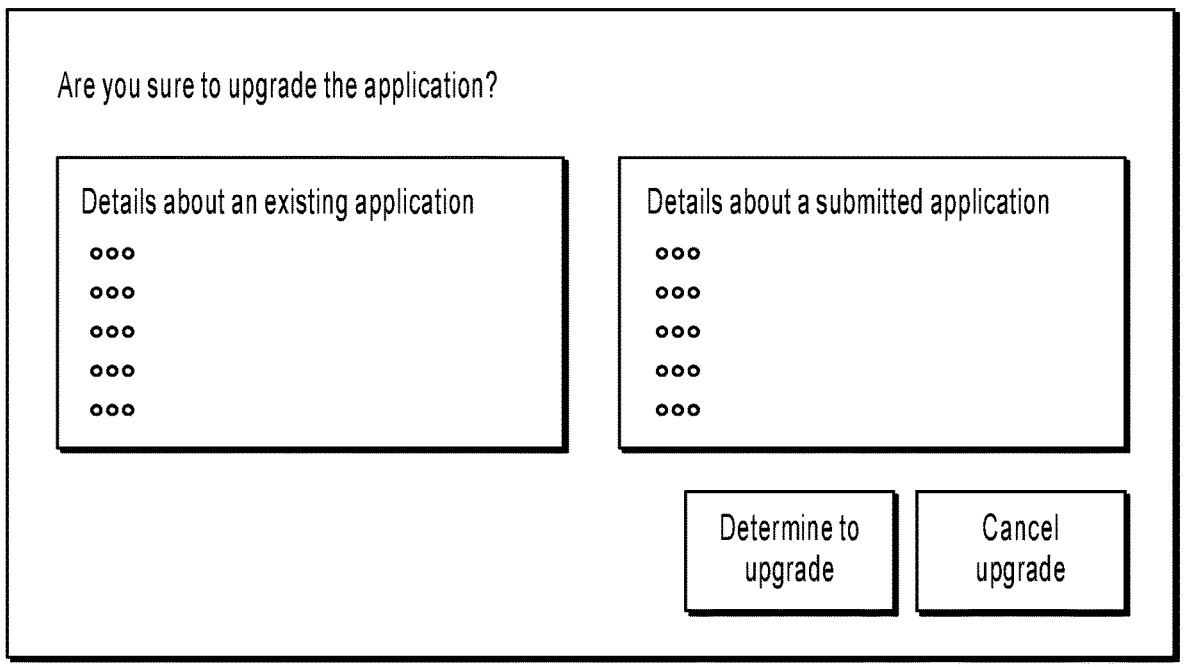
FIG. 3 is a schematic diagram illustrating prompt information, according to an implementation of the present application.

In a schematic diagram illustrating prompt information shown in FIG. 3, the application management module can output prompt information used for determining: "Are you sure to upgrade the application?", and can further display details about the existing application that has the same name and details about the submitted application that has the same name.

According to the present implementation, the application management module is reconstructed, so that the application management module can allow the user to submit the application that has the same name, and simplify two commands that need to be submitted manually into one upgrade command. As such, the user needs to submit one upgrade command, so that the problem in the previous implementation can be avoided, and the problem in the existing technology that a relatively long time is consumed because human participation is needed in an application upgrade process still can be alleviated, thereby reducing the time consumed for the application upgrade.

The method for upgrading an application described in the present application can be applied to a JStorm scenario. In other words, the application includes a JStorm application, and correspondingly, the process includes a jvm process.

Figure 4:
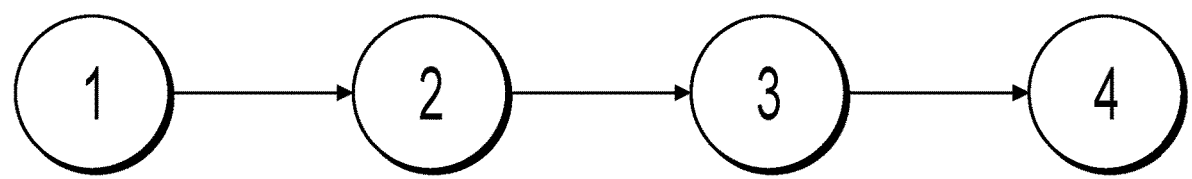
FIG. 4 is a schematic diagram illustrating nodes in an application, according to an implementation of the present application.

Generally, when the application processes input data, the procedure can be divided into a plurality of processing steps, and each processing step can be considered as one node. Usually, each node corresponds to one process. A node connected to a data source can be referred to as a root node (spout), and other nodes can be referred to as sub-nodes (bolt). In a schematic diagram illustrating nodes shown in FIG. 4, node 1 is a root node, and nodes 2, 3, and 4 are sub-nodes. Each piece of data is processed in a sequence of nodes.

In the existing technology, when an old application is disabled, it needs to be manually determined that processing of unprocessed data in the old application is completed. However, manual determining is not necessarily accurate, and determining needs to depend on experience. Therefore, it cannot be ensured that the unprocessed data in the old application is completely processed.

Figure 5:
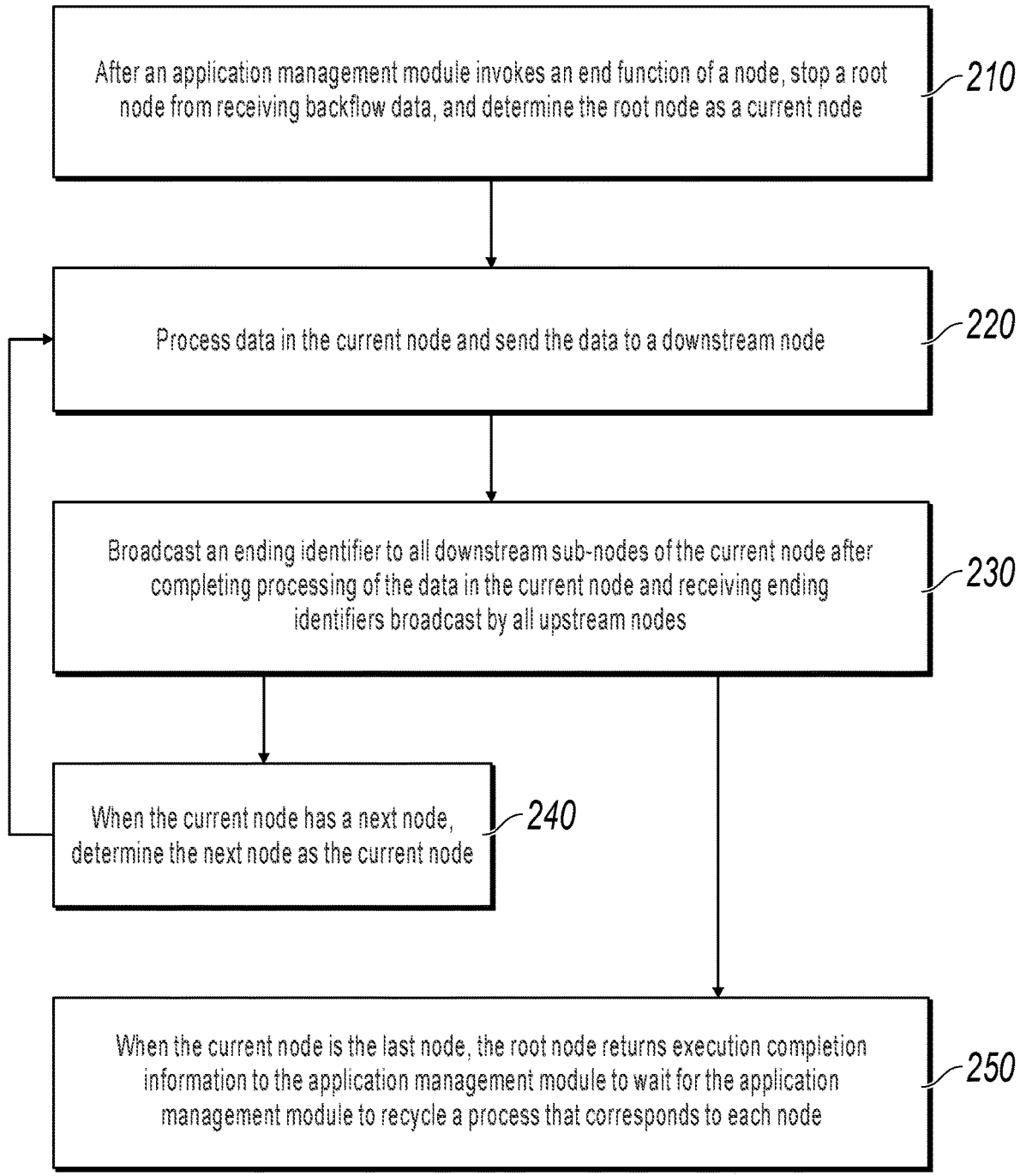
FIG. 5 is a flowchart illustrating a method for disabling an application, according to an implementation of the present application.

To alleviate the problem, FIG. 5 shows a flowchart illustrating a method for disabling an application, according to an implementation of the present application. The present implementation is described from the perspective of an application side to be upgraded, and includes the following steps.

Step 210: After an application management module invokes an end function of a node, stop a root node from receiving backflow data, and determine the root node as a current node.

In the present implementation, as described above, the root node is connected to a data source, and when the application is disabled, the root node needs to be stopped from receiving backflow data from the data source.

Step 220: Process data in the current node and send the data to a downstream node.

In the present implementation, unprocessed data in the current node needs to be processed, and the processed data needs to be sent to the downstream node. Data processed by root node 1 in FIG. 4 needs to be sent to the downstream node, namely, node 2.

Step 230: Broadcast an ending identifier to all downstream sub-nodes of the current node after completing processing of the data in the current node and receiving ending identifiers broadcast by all upstream nodes.

In the present implementation, the ending identifier is used to indicate that processing of the data in the node is completed. For example, node 2 broadcasts an ending identifier, and it indicates that processing of data in node 2 is completed.

After completing data processing, the current node needs to determine whether the ending identifiers broadcast by all the upstream nodes are received, and the current node broadcasts the ending identifier to all the downstream sub-nodes of the current node after completing processing of the data in the current node and receiving the ending identifiers broadcast by all the upstream nodes.

Step 240: When the current node has a next node, determine the next node as the current node, and return to perform step 220.

Step 250: When the current node is the last node, the root node returns execution completion information to the application management module to wait for the application management module to recycle a process that corresponds to each node.

In the present implementation, after receiving the ending identifiers broadcast by all the upstream nodes, the last node can notify the root node, and then the root node returns the execution completion information to the application management module to wait for the application management module to recycle the process that corresponds to each node.

According to the present implementation, an application ending procedure is reconstructed, so that any node needs to broadcast an ending identifier to all downstream nodes when completing processing of data in the node and receiving ending identifiers broadcast by all upstream nodes. The root node can return the execution completion information to the application management module after all the nodes complete data processing, to wait for the application management module to recycle the process that corresponds to each node. Therefore, it can be ensured, by using the ending identifier, that processing of data in each node of the application is completed, to ensure the integrity of data processing and avoid omission that occurs when completion of data processing is determined manually. In addition, because there is no human participation, a time consumed for an application upgrade can be reduced.

In the present implementation, the application management module and the application upgrade procedure are reconstructed, so that when the application is upgraded, the application management module and the application itself can automatically complete upgrade, and the entire process does not need human participation, thereby reducing the time needed for the application upgrade.

The method for disabling an application described in the present application can be applied to a JStorm scenario. In other words, the application includes a JStorm application, and correspondingly, the process includes a jvm process.

Corresponding to the previous implementation of the method for upgrading an application, the present application further provides an implementation of an apparatus for upgrading an application.

Figure 6:
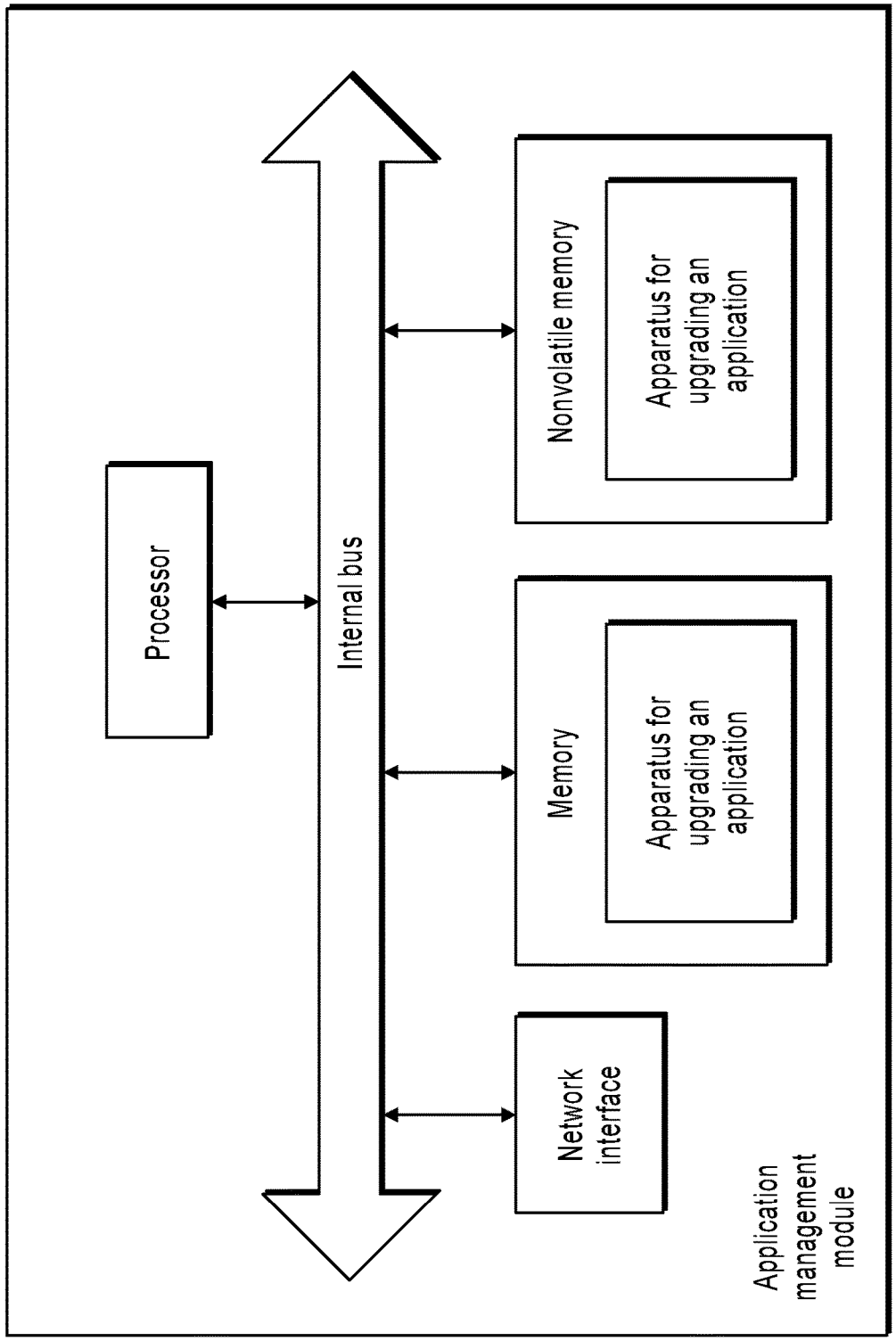
FIG. 6 is a structural diagram of hardware of a device where an apparatus for upgrading an application is located, according to the present application.

The implementation of the apparatus for upgrading an application in the present application can be applied to an application management module. The apparatus implementation can be implemented by software, hardware, or a combination of hardware and software. Software implementation is used as an example. As a logical apparatus, the apparatus is formed by reading a corresponding computer program instruction in a nonvolatile memory to a memory by a processor of a device where the apparatus is located. In terms of hardware, FIG. 6 is a structural diagram illustrating hardware of the device where the apparatus for upgrading an application in the present application is located. In addition to a processor, a network interface, a memory, and a nonvolatile memory shown in FIG. 6, the device where the apparatus in the present implementation is located usually can further include other hardware based on an actual function of the apparatus for upgrading an application. Details are omitted here for simplicity.

Figure 7:
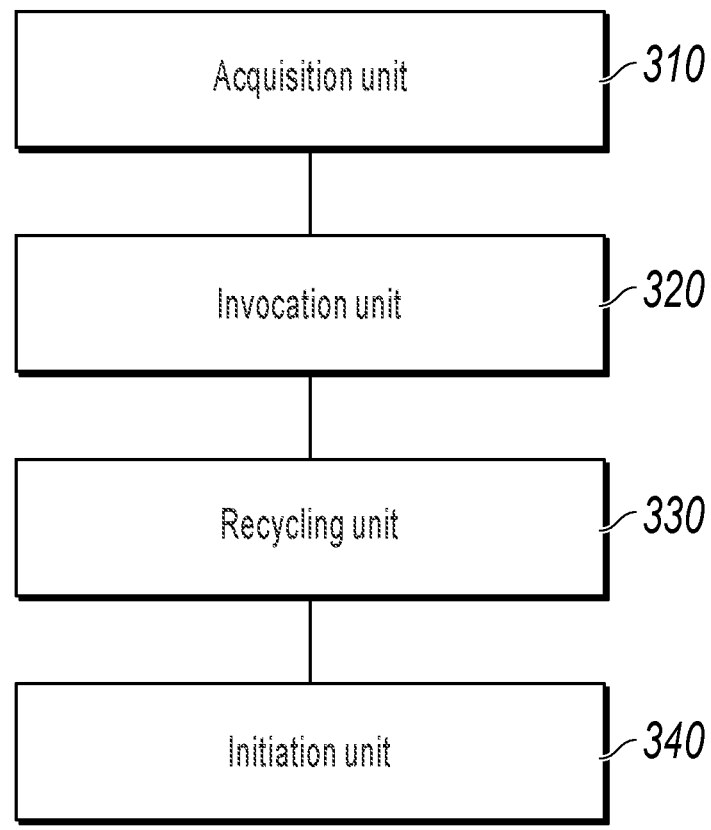
FIG. 7 is a schematic diagram illustrating modules of an apparatus for upgrading an application, according to an implementation of the present application.

FIG. 7 is a diagram illustrating modules of an apparatus for upgrading an application, according to an implementation of the present application. The present implementation is described from the perspective of an application management module side. The apparatus includes an acquisition unit 310, an invocation unit 320, a recycling unit 330, and an initiation unit 340.

The acquisition unit 310 is configured to obtain an application name of a submitted application.

The invocation unit 320 is configured to trigger a predetermined disable command when the submitted application has the same name as an existing application, to invoke an end function of each node in the existing application.

The recycling unit 330 is configured to recycle a process occupied by each node when receiving execution completion information returned by the existing application.

The initiation unit 340 is configured to trigger a predetermined start command when recycling is completed, to start a process that corresponds to each node in the submitted application.

In an optional implementation, the invocation unit 320 includes the following: a determining subunit, configured to determine whether a submitted upgrade command for the existing application is received when the submitted application has the same name as the existing application; and an invocation subunit, configured to trigger the predetermined disable command when the submitted upgrade command for the existing application is received, to invoke the end function of each node in the existing application.

In an optional implementation, the application includes a JStorm application.

The process includes a jvm process.

Corresponding to the previous implementation of the method for disabling an application, the present application further provides an implementation of an apparatus for disabling an application.

Figure 8:
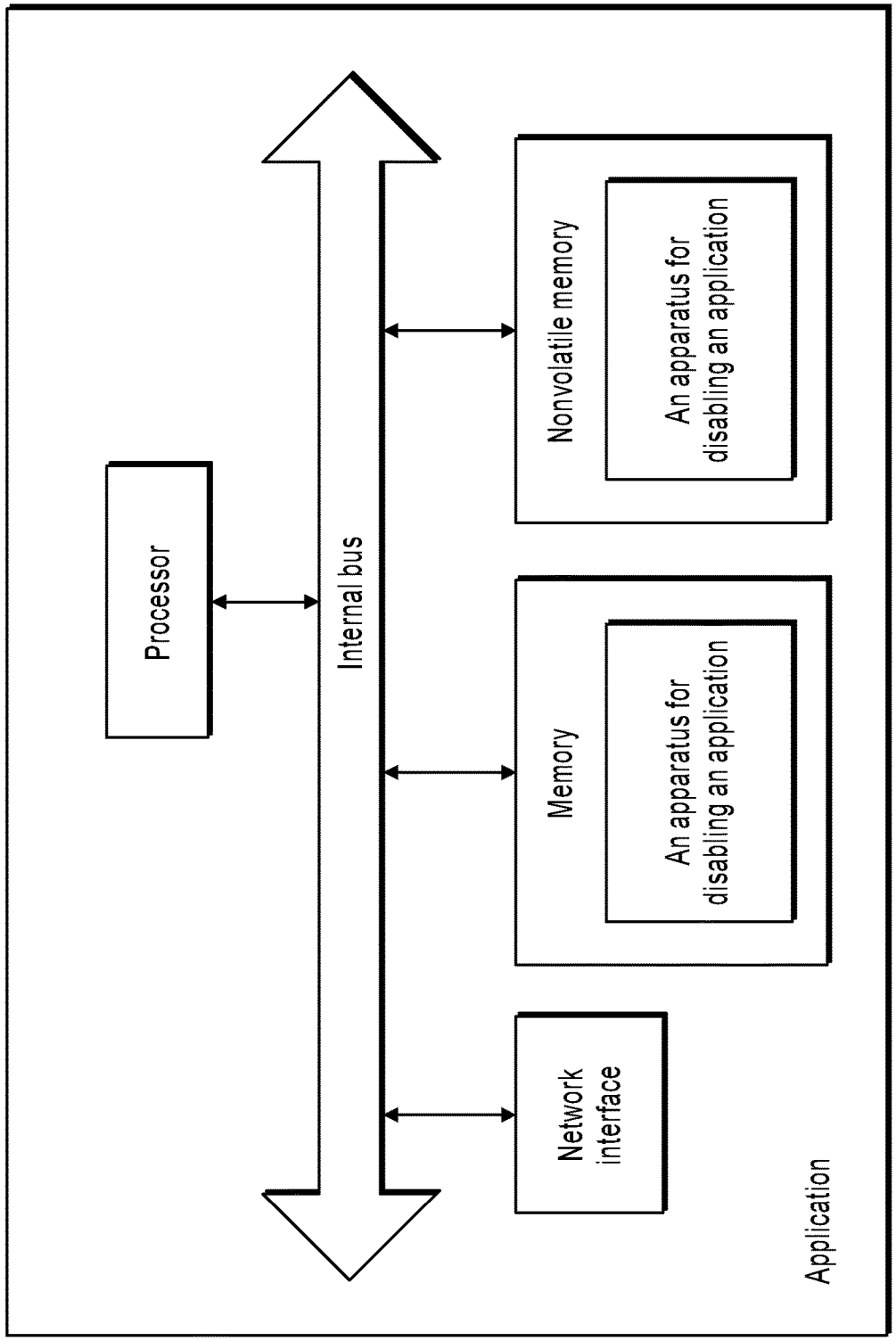
FIG. 8 is a structural diagram of hardware of a device where an apparatus for disabling an application is located, according to the present application.

The implementation of the apparatus for disabling an application in the present application can be applied to an application to be upgraded. The apparatus implementation can be implemented by software, hardware, or a combination of hardware and software. Software implementation is used as an example. As a logical apparatus, the apparatus is formed by reading a corresponding computer program instruction in a nonvolatile memory to a memory by a processor of a device where the apparatus is located. In terms of hardware, FIG. 8 is a structural diagram illustrating hardware of the device where the apparatus for disabling an application in the present application is located. In addition to a processor, a network interface, a memory, and a nonvolatile memory shown in FIG. 8, the device where the apparatus in the present implementation is located usually can further include other hardware based on an actual function of the apparatus for disabling an application. Details are omitted here for simplicity.

Figure 9:
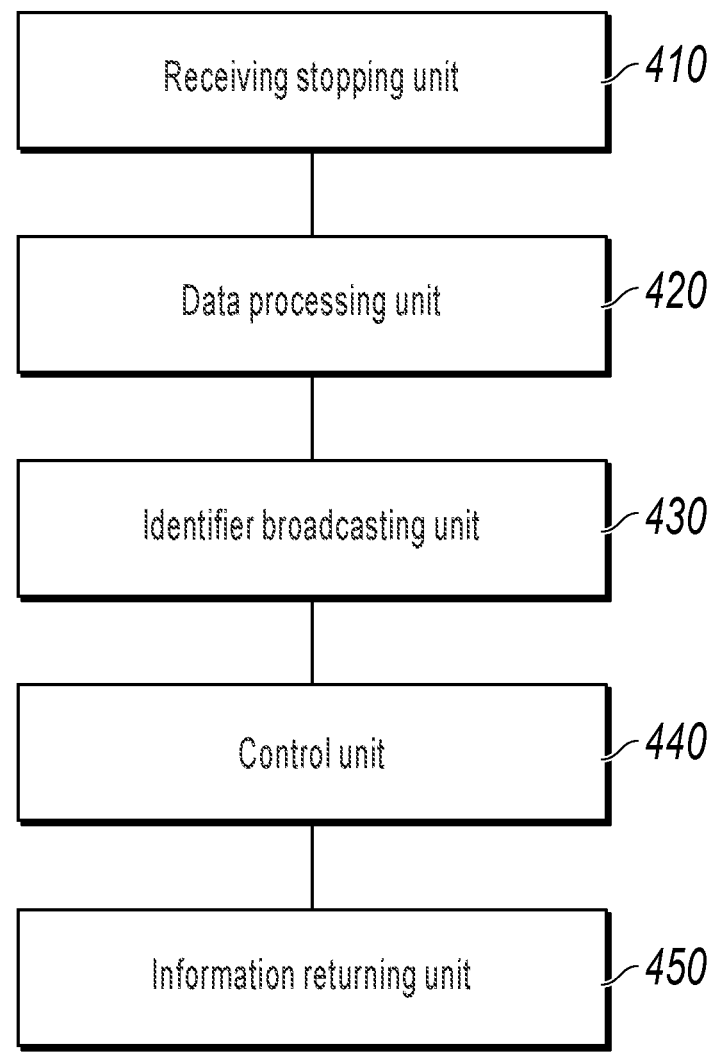
FIG. 9 is a schematic diagram illustrating modules of an apparatus for disabling an application, according to an implementation of the present application.

FIG. 9 is a diagram of modules of an apparatus for disabling an application, according to an implementation of the present application. The present implementation is described from the perspective of an application side to be upgraded. The apparatus includes a receiving stopping unit 410, a data processing unit 420, an identifier broadcasting unit 430, a control unit 440, and an information returning unit 450.

The receiving stopping unit 410 is configured to: after an application management module invokes an end function of a node, stop a root node from receiving backflow data, and determine the root node as a current node.

The data processing unit 420 is configured to process data in the current node and send the data to a downstream node.

The identifier broadcasting unit 430 is configured to broadcast an ending identifier to all downstream sub-nodes of the current node after processing of the data in the current node is completed and ending identifiers broadcast by all upstream nodes are received.

The control unit 440 is configured to: when the current node has a next node, determine the next node as the current node, and then input data of the next node to the data processing unit.

The information returning unit 450 is configured to: when the current node is the last node, return, by the root node, execution completion information to the application management module to wait for the application management module to recycle a process that corresponds to each node.

In an optional implementation, the application includes a JStorm application.

The process includes a jvm process.

In conclusion, in the implementations of the present application, the application management module (such as a topology manager (TM)) is reconstructed, so that the application management module can allow a user to submit the application that has the same name as the existing application. Therefore, the application management module can automatically upgrade the existing application that has the same name when detecting that the user submits the application that has the same name. As such, the problem in the existing technology that a relatively long time is consumed because human participation is needed in an application upgrade process can be avoided, thereby reducing a time consumed for an application upgrade. In the implementations of the present application, an application ending procedure is further reconstructed, so that any node needs to broadcast an ending identifier to all downstream nodes when completing processing of data in the node and receiving ending identifiers broadcast by all upstream nodes. The root node can return the execution completion information to the application management module after all the nodes complete data processing, to wait for the application management module to recycle the process that corresponds to each node. Therefore, it can be ensured, by using the ending identifier, that processing of data in each node of the application is completed, to ensure the integrity of data processing and avoid omission that occurs when completion of data processing is determined manually. In addition, because there is no human participation, the time consumed for the application upgrade can be reduced.

For an implementation process of functions and roles of the units in the apparatus, references can be made to an implementation process of corresponding steps in the previous method. Details are omitted here for simplicity.

Because an apparatus implementation basically corresponds to the method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a plurality of network units. Some or all of the modules can be selected based on actual needs to achieve the objectives of the solutions in the present application. A person of ordinary skill in the art can understand and implement the implementations of the present application without creative efforts.

A person skilled in the art can easily figure out another implementation solution of the present application after considering the present specification and practicing the disclosed specification here. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the implementations are merely considered as examples. The actual scope and the spirit of the present application are pointed out by the following claims.

It should be understood that the present application is not limited to the accurate structures described above and shown in the accompanying drawings, and modifications and changes can be made without departing from the scope of the present application. The scope of the present application is limited only by the appended claims.

Figure 10:
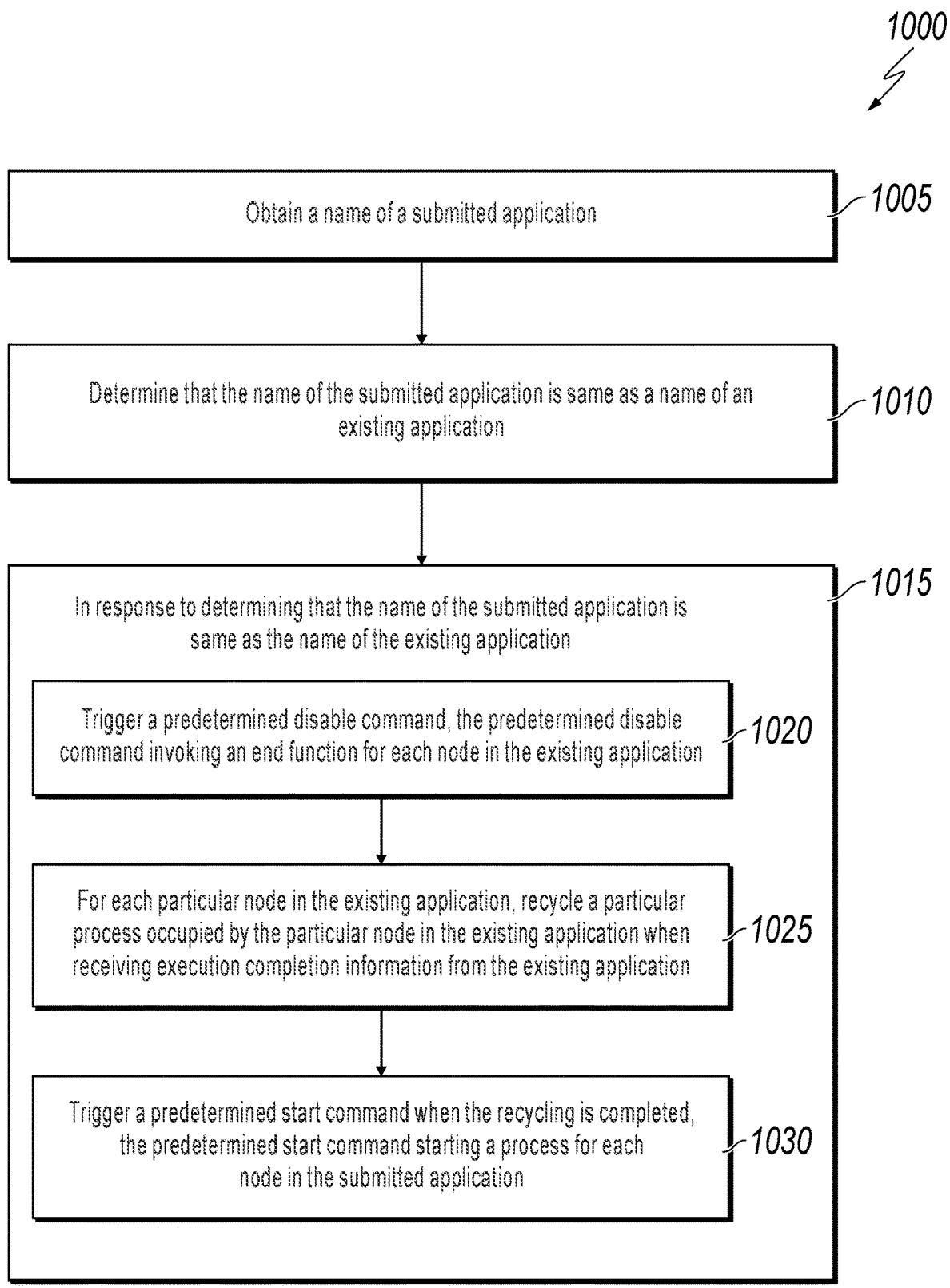
FIG. 10 is a flowchart illustrating an example of a computer-implemented method for automatically upgrading an application, according to an implementation of the present disclosure.

FIG. 10 is a flowchart illustrating an example of a computer-implemented method 1000 for automatically upgrading an application, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1005, a name of a submitted application is obtained. In some implementations, the submitted application is an application to be upgraded. For example, the submitted application can include a JStorm application. Storm is an open-source distributed fault-tolerant real-time computing system used for real-time processing. JStorm is a quasi-Storm system re-implemented by using JAVA.

In some implementations, an application manager (such as, a topology manager (TM)) on a device can automatically upgrade an application in response to receiving an application upgrade instruction. For example, a user of the device can submit an application for upgrade on the device (e.g., the user initiates an application upgrade process). In some implementations, the device can be, for example, a smartphone, a laptop, or a tablet. An application for upgrade can be a mobile application (APP) installed on, for example, a mobile device, or a Web application installed on, for example, a personal computer (PC). In some implementations, a JStorm application can be deployed in the TM, and can communicate with the TM to perform functions including, for example, an application upgrade. From 1005, method 1000 proceeds to 1010.

At 1010, a determination is made that the name of the submitted application is same as a name of an existing application. In some implementations, the existing application is an application that is currently running on the device. For example, the determination can indicate that the existing application is to be upgraded. In some implementations, the existing application can include a JStorm application. From 1010, method 1000 proceeds to 1015.

At 1015, in response to determining that the name of the submitted application is same as the name of the existing application, steps 1020, 1025, and 1030 can be automatically performed. For example, the TM can perform functions to automatically upgrade the existing application. From 1015, method 1000 proceeds to 1020.

At 1020, a predetermined disable command is triggered. In some implementations, the predetermined disable command invokes an end function for each node in the existing application. For example, the end function can be used by a particular node to process unfinished data at the particular node, and to wait to recycle a corresponding process. In some implementations, before triggering the predetermined disable command, a determination is made as to whether a submitted upgrade command for the existing application is received. If it is determined that the submitted upgrade command for the existing application is received, the predetermined disable command is triggered. For example, after a user confirms the application upgrade, the submitted upgrade command is returned. Otherwise, if it is determined that the submitted upgrade command for the existing application is not received (e.g., the user did not confirm the application upgrade), the predetermined disable command is not triggered. From 1020, method 1000 proceeds to 1025.

At 1025, for each particular node in the existing application, a particular process occupied by the particular node in the existing application is recycled when receiving execution completion information from the existing application. For example, once the end function is invoked, the end function can wait for each node in the existing application to finish processing unfinished data. In some implementations, once the existing application completes processing of data (e.g., all nodes in the existing application finish processing unfinished data), the existing application can return execution completion information. For example, the execution completion information can indicate that all processes occupied by all nodes in the existing application are ready to be recycled. In some implementations, a single node in the existing application corresponds to a single process. In some implementations, the particular process occupied by the particular node in the existing application can include a JAVA Virtual Machine (JVM) process when the existing application is a JStorm application. From 1025, method 1000 proceeds to 1030.

At 1030, a predetermined start command is triggered when the recycling is completed. For example, once all processes occupied by all nodes in the existing application are recycled, the recycling is completed, which indicates that the existing application is completely closed and the submitted application can be started. In some implementations, the predetermined start command can start a process for each node in the submitted application. For example, for each node in the submitted application, a new corresponding process can be started. In some implementations, the process for each node in the submitted application can include a JVM process when the submitted application is a JStorm application. In some implementations, a single node in the submitted application corresponds to a single process. In some implementations, after all processes corresponding to all nodes in the submitted application are started, the submitted application is started, which indicates that the application upgrade process is completed.

In some implementations, the obtaining, determining, triggering the predetermined disable command, recycling, and triggering the predetermined start command are automatically performed by the TM of the device. For example, the TM can be modified to allow a user of the device to submit an application for upgrade. The application for upgrade can have a same name as an application currently running on the device. After 1030, method 1000 can stop.

An application can be upgraded. Normally, during an application upgrade process, the application is down and can't provide service. In addition, a user is involved in multiple phases of the application upgrade process, and may cause the application upgrade process to take a long time. The subject matter described in this specification provides a fast application upgrade method with less user intervention and service down time. For example, an application manager can be modified to allow a user submitting an application, having a same name as a currently running application, for upgrade. The user does not need to terminate the currently running application before submitting the application for upgrade. In doing so, multiple user commands that need to be submitted manually can be simplified into one single upgrade command. As a result, user intervention during an application upgrade process can be reduced, thereby reducing the time consumed by the application upgrade process.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining a name of a submitted application;
   determining that the name of the submitted application is same as a name of an existing application;
   in response to determining that the name of the submitted application is same as the name of the existing application, determining that a user submitted upgrade command for the existing application is received; and
   in response to determining that the user submitted upgrade command for the existing application is received:
      triggering a predetermined disable command, wherein the predetermined disable command invokes an end function for each node in the existing application;
      for each particular node in the existing application, recycling a particular process occupied by the particular node in the existing application when receiving execution completion information from the existing application, wherein the execution completion information indicates that unprocessed data in the existing application has been processed;
      triggering a predetermined start command when the recycling is completed, wherein the predetermined start command starts a process for each node in the submitted application, and wherein the existing application is disabled when the recycling is completed; and
   wherein the obtaining, determining, triggering the predetermined disable command, recycling, and triggering the predetermined start command are automatically performed by a topology manager (TM) of a device.

2. The computer-implemented method of claim 1, wherein the submitted application is an application to be upgraded, and the existing application is an application that is currently running.

3. The computer-implemented method of claim 1, wherein the process for each node in the submitted application includes a JAVA Virtual Machine (JVM) process.

4. The computer-implemented method of claim 1, wherein the particular process occupied by the particular node in the existing application includes a JVM process.

5. The computer-implemented method of claim 1, wherein the TM allows a user of the device to submit an application for upgrade, and the application for upgrade has a same name as an application currently running on the device.

6. A non-transitory, computer-readable medium storing one or more instructions executable by a computer system to perform operations comprising:
   obtaining a name of a submitted application;
   determining that the name of the submitted application is same as a name of an existing application;
   in response to determining that the name of the submitted application is same as the name of the existing application, determining that a user submitted upgrade command for the existing application is received; and
   in response to determining that the user submitted upgrade command for the existing application is received:
      triggering a predetermined disable command, wherein the predetermined disable command invokes an end function for each node in the existing application;
      for each particular node in the existing application, recycling a particular process occupied by the particular node in the existing application when receiving execution completion information from the existing application, wherein the execution completion information indicates that unprocessed data in the existing application has been processed;
      triggering a predetermined start command when the recycling is completed, wherein the predetermined start command starts a process for each node in the submitted application, and wherein the existing application is disabled when the recycling is completed, and
   wherein the obtaining, determining, triggering the predetermined disable command, recycling, and triggering the predetermined start command are automatically performed by a topology manager (TM) of a device.

7. The non-transitory, computer-readable medium of claim 6, wherein the submitted application is an application to be upgraded, and the existing application is an application that is currently running.

8. The non-transitory, computer-readable medium of claim 6, wherein the process for each node in the submitted application includes a JAVA Virtual Machine (JVM) process.

9. The non-transitory, computer-readable medium of claim 6, wherein the particular process occupied by the particular node in the existing application includes a JVM process.

10. The non-transitory, computer-readable medium of claim 6, wherein the TM allows a user of the device to submit an application for upgrade, and the application for upgrade has a same name as an application currently running on the device.

11. A computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising:
   obtaining a name of a submitted application;
   determining that the name of the submitted application is same as a name of an existing application;
   in response to determining that the name of the submitted application is same as the name of the existing application, determining that a user submitted upgrade command for the existing application is received; and in response to determining that the user submitted upgrade command for the existing application is received:

triggering a predetermined disable command, wherein the predetermined disable command invokes an end function for each node in the existing application;

for each particular node in the existing application, recycling a particular process occupied by the particular node in the existing application when receiving execution completion information from the existing application, wherein the execution completion information indicates that unprocessed data in the existing application has been processed;

triggering a predetermined start command when the recycling is completed, wherein the predetermined start command starts a process for each node in the submitted application, and wherein the existing application is disabled when the recycling is completed; and wherein the obtaining, determining, triggering the predetermined disable command, recycling, and triggering the predetermined start command are automatically performed by a topology manager (TM) of a device.

12. The computer-implemented system of claim 11, wherein the submitted application is an application to be upgraded, and the existing application is an application that is currently running.

13. The computer-implemented system of claim 11, wherein the process for each node in the submitted application includes a JAVA Virtual Machine (JVM) process.

14. The computer-implemented system of claim 11, wherein the particular process occupied by the particular node in the existing application includes a JVM process.

15. The computer-implemented system of claim 11, wherein: the TM allows a user of the device to submit an application for upgrade, and the application for upgrade has a same name as an application currently running on the device.

* * * * *

UNITED STATES PATENT AND TRADEMARK OFFICE
CERTIFICATE OF CORRECTION

PATENT NO. : 10,678,532 B2
APPLICATION NO. : 16/395990
DATED : June 9, 2020
INVENTOR(S) : Wenqi Ma and Lei Cheng It is certified that error appears in the above-identified patent and that said Letters Patent is hereby corrected as shown below:

On the Title Page

Item (56) Other Publications, Column 2, Line 2, delete "retreived" and insert -- retrieved --, therefor.

Signed and Sealed this
Thirteenth Day of October, 2020

Andrei Iancu
*Director of the United States Patent and Trademark Office*